United States Patent
Schultheis et al.

(10) Patent No.: US 8,480,131 B2
(45) Date of Patent: Jul. 9, 2013

(54) INTEGRATED PRESSURE VESSELS FOR VEHICULAR APPLICATIONS

(75) Inventors: Valentin Schultheis, Darmstadt (DE); Thorsten Schutz, Selzen (DE); Helmut Schuermann, Maxdorf (DE); Wolfgang Bleser, Darmstadt (DE); Andreas Bleier, Babenhausen (DE)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 12/894,831

(22) Filed: Sep. 30, 2010

(65) Prior Publication Data

US 2012/0080875 A1    Apr. 5, 2012

(51) Int. Cl.
     *B60K 15/07*        (2006.01)
(52) U.S. Cl.
     USPC ............................ 280/831; 280/830; 280/834
(58) Field of Classification Search
     USPC ............................ 280/834, 830, 831; 220/562
     See application file for complete search history.

(56) References Cited

U.S. PATENT DOCUMENTS

| | | | | |
|---|---|---|---|---|
| 6,257,360 B1 * | 7/2001 | Wozniak et al. | ............. | 180/69.5 |
| 6,708,719 B2 * | 3/2004 | Idoguchi | ................ | 137/266 |
| 7,137,474 B2 * | 11/2006 | Yokote | ............. | 180/314 |
| 7,189,040 B2 * | 3/2007 | Sharp et al. | ............. | 410/42 |
| 7,264,277 B2 * | 9/2007 | Ono et al. | ............. | 280/830 |
| 7,270,209 B2 * | 9/2007 | Suess | ............. | 180/69.5 |
| 7,543,667 B2 * | 6/2009 | Hwang et al. | ............. | 180/69.4 |
| 7,624,753 B2 * | 12/2009 | Suess et al. | ............. | 137/266 |
| 7,631,901 B2 * | 12/2009 | Diehl | ............. | 280/834 |
| 7,658,414 B2 * | 2/2010 | Watanabe et al. | ............. | 280/834 |
| 7,819,431 B2 * | 10/2010 | Minami | ............. | 280/834 |
| 8,083,263 B2 * | 12/2011 | Yamanami et al. | ............. | 280/830 |
| 2004/0239095 A1 * | 12/2004 | Wozniak et al. | ............. | 280/834 |
| 2006/0061081 A1 * | 3/2006 | Kresse et al. | ............. | 280/834 |
| 2006/0197332 A1 * | 9/2006 | Hashimura | ............. | 280/834 |
| 2009/0309349 A1 * | 12/2009 | Yamanami et al. | ............. | 280/830 |

FOREIGN PATENT DOCUMENTS

| | | |
|---|---|---|
| DE | 24 12 310 | 9/1975 |
| DE | 196 23 844 A1 | 1/1997 |
| DE | 298 22 006 | 5/1999 |
| DE | 600 06 898 T2 | 5/2000 |
| DE | 200 05 887 U1 | 9/2000 |
| DE | 10 2005 037 636 A1 | 8/2005 |
| DE | 10 2005 037 637 A1 | 8/2005 |
| DE | 10 2009 033 023 A1 | 1/2010 |

* cited by examiner

*Primary Examiner* — Kevin Hurley
*Assistant Examiner* — Michael Stabley
(74) *Attorney, Agent, or Firm* — Dinsmore & Shohl LLP

(57) ABSTRACT

A fuel vessel assembly for a fuel cell-powered vehicle and a method of increasing the structural rigidity of a fuel cell-powered vehicle. A vessel for storage of hydrogen or related fuel cell-compatible fuel is rigidly attachable to a vehicular frame or related load-bearing structure through one or more shells that extend from the vessel. Loads imparted to one or more of the shell, vessel frame are transmitted between them through the connection between the assembly and the frame such that a load-bearing capability inherent in the frame is enhanced by the assembly.

21 Claims, 8 Drawing Sheets

INTEGRATED PRESSURE VESSELS FOR VEHICULAR APPLICATIONS

BACKGROUND OF THE INVENTION

The present invention relates generally to devices and methods for placing high pressure storage vessels into a vehicle structure, and more particularly to a way to integrate a vessel for storing a pressurized fuel source on a vehicle that employs a fuel cell-based architecture as a source of motive power such that the vessel increases the load-bearing capability of the vehicle.

In a typical fuel cell system, hydrogen or a hydrogen-rich gas is supplied through a flowpath to a catalytic electrode on one side of a fuel cell while oxygen (such as in the form of atmospheric oxygen) is supplied through a separate flowpath to another catalytic electrode situated elsewhere on the fuel cell. The electrochemical conversion of the elemental hydrogen and oxygen into hydrogen and oxygen ions on these electrodes (called anodes and cathodes, respectively) allows dissociated electrons to be routed through an electrically-conductive direct current (DC) circuit to produce useful work. One of the chief attributes of electric current production through fuel cells is their non-polluting nature, as the byproduct accompanying the use of hydrogen and oxygen reactants is water vapor. In one form of fuel cell, called the proton exchange membrane (PEM) fuel cell, an electrolyte in the form of a proton-transmissive membrane is sandwiched between the anode and cathode to produce a layered structure commonly referred to as a membrane electrode assembly (MEA). Each MEA forms a single fuel cell, and many such single cells can be combined to form a fuel cell stack, increasing the power output thereof. Multiple stacks can be coupled together to further increase power output. Because of its relatively simple and robust construction, as well as its non-polluting nature, the PEM fuel cell has shown particular promise for vehicular applications.

Nevertheless, one challenge for fuel cell vehicles is increasing their power-to-weight ratio relative to conventional propulsion systems, where much of the ancillary equipment weight associated with the fuel cell system is parasitic. One such component is the on-board fuel storage system, particularly as it relates to the hydrogen fuel storage tank, where its robustness and associated weight are dictated by the need to preserve tank integrity while containing a pressurized supply of hydrogen or related fuel (such as methanol or a hydrogen precursor) over the expected life of the vehicle, even in situations where both normal use (such as routine maneuvering and exposure to road irregularities) and extreme use (such as due to an accident or related impact) could otherwise damage the tank, vehicle or both. There accordingly exists a need to provide enhanced structural rigidity through the use of such components that are already present in a transportation vehicle. There further exists a need to reduce the penalties associated with placing a high pressure fuel storage vessel in a transportation vehicle.

SUMMARY OF THE INVENTION

These needs are met by the present invention, where high pressure fuel storage tanks and related vessels take are coupled to the vehicle in such a way to increase the stiffness of the vehicle. The structural advantage made possible by such integration is applicable to configurations where the fuel storage system comprises either a single storage tank or a plurality of tanks, especially in configurations where at least one of the vessels has a large diameter (and concomitant high torsional stiffness). According to a first aspect of the invention, a fuel vessel assembly for a fuel cell-powered vehicle includes a vessel and at least one shell cooperative with the vessel. The vessel forms a fuel storage container with an internal volume, and also includes one or more aperture formed through it to allow the introduction and removal of fuel as needed. The shells act as load-transmitting members so that structural loads that originate from the vessel (such as pressure loads from the fuel), as well as external loads (such as due to loads imparted to the shells through their connection to a vehicular frame or other structural component) are transmitted between the assembly and a load-bearing structure in the vehicle to enhance load-bearing capability inherent in the vehicle structure. In the present context, the term "frame" covers not only traditional body-on-frame vehicular architectures, but also the relatively more recent construction variant known as unibody construction, this latter configuration where the role traditionally played by the frame is replaced by high moment of inertia formations through a monocoque design where parts (for example, outer body panels, roofs or the like) that were not loaded in the more traditional body-on-frame design are now structural members. As such, the term "frame", as it applies to a unibody vehicle without a separate frame, covers such an underlying part of the vehicle upon which many of the other components are attached to, rest upon, or otherwise derive at least a significant portion of their load-carrying capabilities from.

Optionally, the assembly also includes one or more clamping rings disposed about the shell or shells to provide enhanced connectivity between them. In another option, any or all of the vessel, shell and ring may be made from a metal or a composite material, such as a fiber-reinforced composite material. The shell may additionally include unidirectional (UD) fibers, ribs, beads or related structure as supplemental reinforcement against buckling or other damage-inducing modes of force. In another form, the assembly includes numerous shells that extend beyond the vessel to allow (upon connection to a vehicular frame or related load-bearing structural component) the transmission of loads between the assembly and the load-bearing structure. In a more particular form, the numerous shells are secured to the vessel such that upon attachment of the assembly into the vehicle, the attachment is formed along a substantial vertical axis of the vehicle. In one particular form, the shells are disposed about the generally cylindrical periphery of the vessel. In a situation involving two shells at each longitudinal end of the vessel, the two shells would be substantially diametrically opposed from one another. In yet another option, the vessel defines a substantially cylindrical structure with at least one end formed as a dome. The tapered region around the dome can allow a graduated ramp connection to be formed between the dome and the shell. In one form, such graduated connection may be made from successively larger numbers of composite plies or other material buildup.

The assembly may further include a relief valve placed relative to the vessel such that if an excessively high temperature is present around the vessel, the relief valve can open. In one preferred form, the relief valve can be coupled to a temperature sensor so that upon receipt of a signal indicative of such excessive temperature, the relief valve opens to reduce an internal pressure formed in the vessel by any fuel present in the vessel. In the present context, an excessive temperature is one that could be expected to cause damage to the assembly, particularly the vessel, either by reducing the structural properties of the materials making up the assembly, or by overpressure due to heating of the fuel contained in the vessel. In situations where exposure of such an excessive heat needs to more easily reach the relief valve, or temperature sensor that could be used to send a signal to a controller or the relief valve, the one or more shells may include openings formed in them to allow a more free flow of the heat stream that comes from the source of excessive temperature. In still another option, the one or more shells are configured as a free-shaped shell, while in another option, they may be formed as a cylindrical shell.

According to another aspect of the invention, a vehicular chassis includes a frame and a fuel vessel assembly. The vessel is secured to the frame through one or more connections in the form of shells. By its design configuration and material choice, the frame inherently has a resistance to deformation from an externally-applied load. The fuel vessel assembly includes one or more vessels defining a fuel storage containing volume with one or more apertures to allow fuel to be introduced into, contained within and removed from the vessel. The shell is secured to the vessel such that deformation-producing structural loads are transmitted between the assembly and the frame such that the inherent resistance to deformation defined in the frame is enhanced by the assembly.

Optionally, the frame defines a vertical component such that the structural coupling between the assembly and the frame forms numerous connection locations along the vertical component. By having such connections form predominantly along a vertical axis (for example, the Cartesian z-axis as described in more detail below) rather than along a horizontal axis, the overall moment of inertia of the frame is enhanced by giving it more of a box-like profile. The assembly may additionally include one or more clamping rings disposed about the shell to provide enhanced connectivity between the vessel and the shell. At least a portion of the assembly can be made from a metal or a fiber-reinforced composite material, and a temperature protection device may also be employed. Such as device could include a relief valve cooperative with the vessel such that upon being exposed to an excessive temperature, the relief valve opens to reduce an internal pressure caused by fuel in the vessel.

According to another aspect of the invention, a method of enhancing the structural resistance to deformation in a fuel cell-powered vehicle is disclosed. The method includes configuring a chassis of the fuel cell-powered vehicle to include a load-bearing frame, and connecting a fuel storage vessel assembly to the chassis such that at least a portion of the deflection loads imparted to the frame are transmitted through the assembly such that it enhances a resistance to deformation inherent in the frame. The assembly includes a vessel defining a volume therein for storage of hydrogen or a related fuel cell fuel, as well as the load-transmitting connection that helps the frame realize the enhanced structural rigidity.

Optionally, the load-transmitting connection comprises numerous shells coupled to the vessel. In a more particular form, the numerous shells are arranged such that the load-transmitting connection forms a plurality of connection locations along a vertical axis component of the vehicle. In another option, hoop-like rings can be used to add more robustness to the location where the shells and vessel are joined. As with the previous aspects, some or all of the vessel, shells and rings of the assembly are formed as a metal or a composite structure. Also as before, pressure on the vessel that might otherwise occur if the vessel is exposed to an excessively high temperature that could lead to expansion of the fuel in the vessel can be relieved. In one form, a pressure-relieving valve may be used in such a capacity.

BRIEF DESCRIPTION OF THE DRAWINGS

The following detailed description of specific embodiments can be best understood when read in conjunction with the following drawings, where like structure is indicated with like reference numerals and in which.

Figure 1:
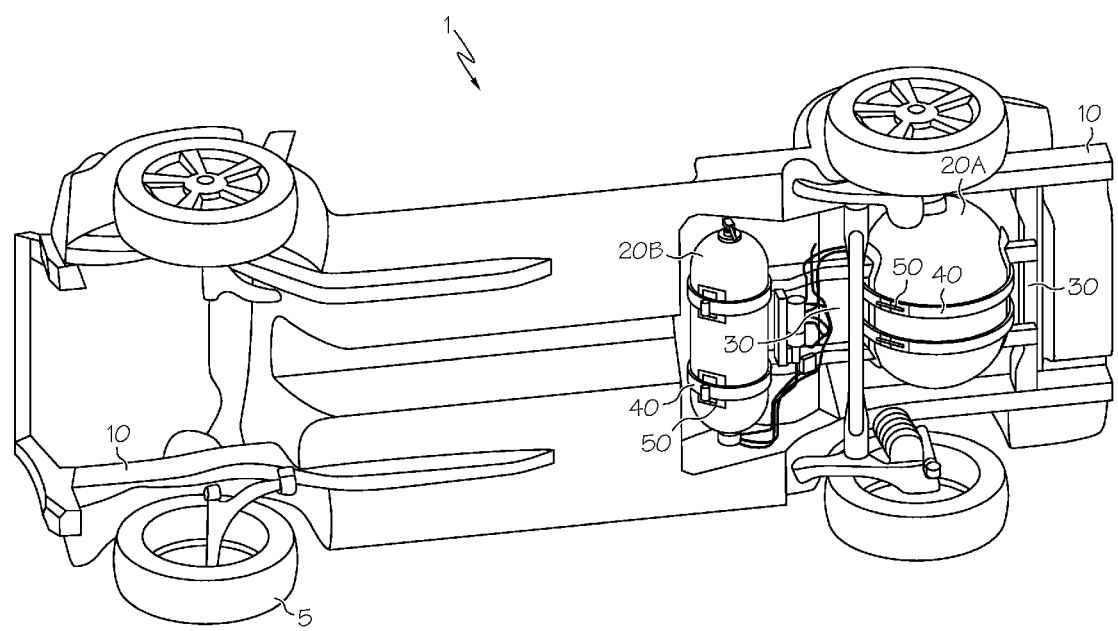
FIG. 1 shows an underside perspective view of a vehicle chassis employing a dual tank configuration according to the prior art.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION OF THE PREFERRED EMBODIMENTS

Referring first to FIG. 1, a tank-mounting arrangement for a high pressure hydrogen storage tank system according to the prior art shows a vehicular chassis 1 with four wheels 5 mounted to a frame 10 made from longitudinally-oriented sections of tubular steel. Frame 10 provides the primary structural support for most of the remaining components of chassis 1, as well as the body (not shown) of the vehicle; much of the load-bearing capability inherent in frame 10 is due to its size, shape, material choice and related design attributes that are understood by those skilled in the art. A fuel cell-based motor (not shown) could be situated in any convenient location within the chassis 1, for example, between the front wheels 5 shown on the left side of the figure. Gaseous fuel is stored in one or more tanks 20. In the version shown, a pair of such tanks includes a larger main tank 20A and a smaller secondary tank 20B. Both tanks 20A, 20B are secured to chassis 1 by crossbars 30, straps 40 and handles 50, where the straps 40 form a hoop-like band around the tanks 20A, 20B and are fastened at their ends by the handles 50. The straps 40 are secured to the crossbars 30 that are in turn mounted to the chassis 1. Examples of the use of such straps are conventional, including being employed to secure cargo during transportation, the fastening of water tanks in fire engines, securing the tank of natural gas driven fork lifts and tanks used to provide fuel in natural gas passenger cars. Besides straps, clamped, braced, bolted and welded arrangements are also known in the art. The weight associated with the arrangement of the tanks 20 along with their strap-based support mechanism as depicted in FIG. 1 is considered parasitic because none of the components contribute to increases in the load-bearing capability of the chassis 1.

Figure 2:
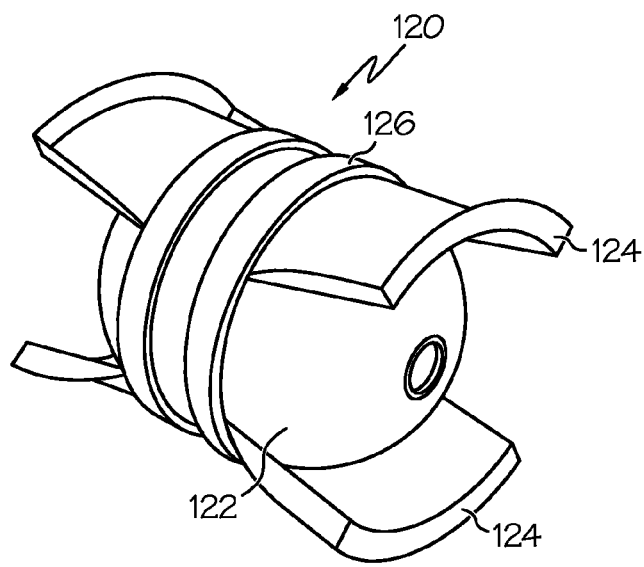
FIG. 2 is a simplified view of a hydrogen storage vessel according to an aspect of the present invention.
Figure 3:
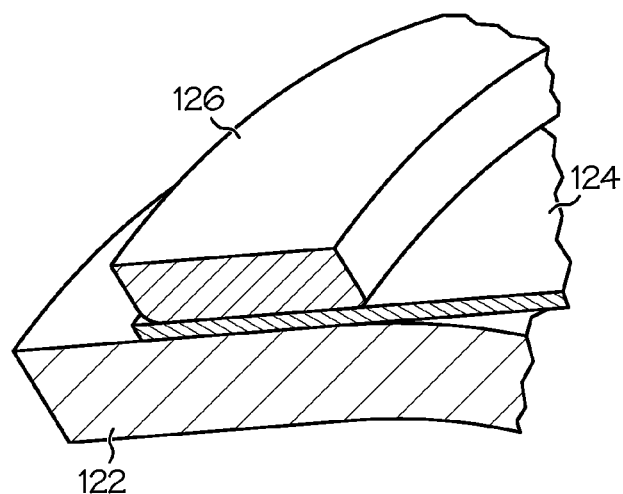
FIG. 3 is a detail view of a portion of the storage vessel of FIG. 2.

FIGS. 2 and 3 show one preferred configuration of a fuel storage vessel assembly 120 according to an aspect of the present invention that can be integrated into a vehicle, preferably in the space occupied by tanks 20 as shown in FIG. 1. In particular, the assembly 120 is made up of a vessel 122 along with tabs or related load-bearing force transmission elements in the form of shells 124 and clamping rings 126 that when placed in cooperation with the frame 10 of chassis 1 can increase the resistance to deflection due to loads imparted to the chassis 1, especially for torsional loads that would otherwise have a tendency to twist the frame 10. Referring with particularity to FIG. 2, the inventors have determined that the preferred way to introduce loads into the vessel 122 is through the multiple shells 124. The inventors have additionally discovered that having the shells 124 be mounted to the vehicular frame 10 at substantially vertically-oriented attachment locations helps to transmit the loads better, as well as reduce overall vehicle weight by eliminating crossbars that might otherwise be used for additional stiffening. Referring with particularity to FIG. 3, the clamped nature of the connection between the ring 126, shell 124 and vessel 122 is shown. A spacer (not shown, but extending around the periphery of the vessel 122 between the two clamping rings 126) could be used to provide additional robustness to the assembly 120.

In a preferred form, four shells 124 and two rings 126 can be attached to a vessel 122 to create the vessel assembly 120, as well as the formation of a graduated ramp joint between the shells 124 and the vessel 122. In such a case, it would be preferable to have the two shells 124 that extend from the same end of vessel 122 to be diametrically opposed from one another. In this way, when the assembly 120 is mounted to the frame 10 (which preferably includes at least some extension vertically upward (for example, in the Cartesian z-direction in FIGS. 4 and 6A through 6C), the vertical nature of the connectivity between the diametrically opposed shells 124 (shown on the right side of FIG. 2, as well as in FIG. 8) can be exploited to provide a higher degree of flexural rigidity that if the connectivity was closer to the plane formed by the Cartesian x-direction and y-direction. Shells 124 are bonded on the vessel 122 and overwound by circumferential layers of one or more clamping rings 126. In one form, the clamping rings 126 may be slightly undersized to ensure a friction fit of the shells 124 onto the vessel 122. In another form, the clamping ring 126 may have a wedge shape to define, among other things, a chamfered edge. The graduated ramp and chamfered edge formed at the joint between the shell 124 and the clamping ring 126 helps to avoid locations of stress concentration, as well as provide a more complete and secure connection between them.

Figure 6A:
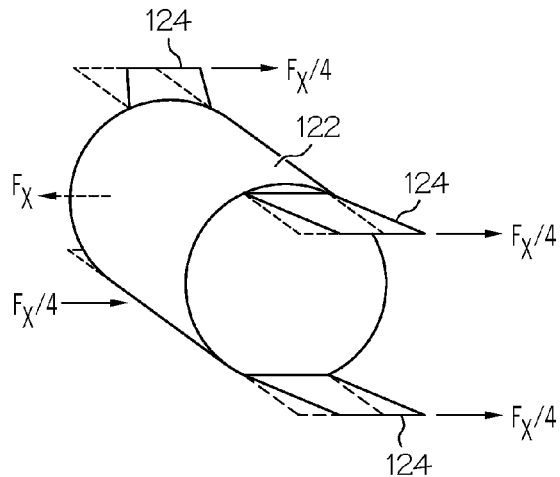
FIGS. 6A through 6C show representative loads due to acceleration along x, y and z Cartesian coordinate directions on the shells of a vessel assembly according to an aspect of the invention.
Figure 6B:
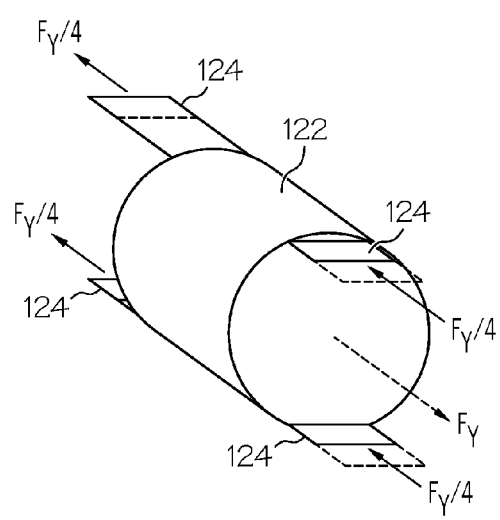
Figure 6C:
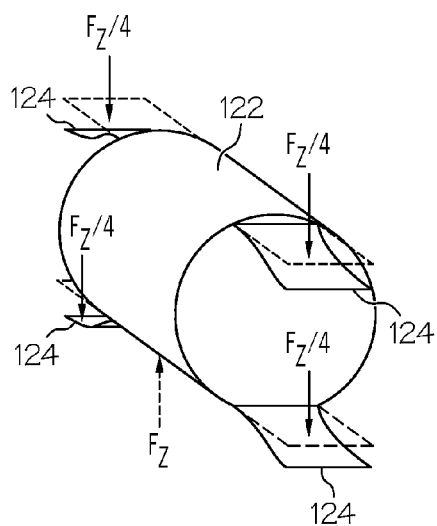

Referring next to FIGS. 6A through 6C, some of the numerous loads that the vessel 122 can be exposed to are shown. Among these are tangential loads, axial tension and compression loads, and flexural loads, all shown relative to Cartesian x, y and z directions in response to an acceleration force F imparted to the frame (not presently shown) or the vessel assembly 120 in the respective direction. Although not presently shown, other loads, such as a radially outward load due to the pressure applied to the vessel 122 by a fluid (such as hydrogen or related fuel) contained therein, or torsional loads due to twisting forces imparted to the frame, are also within the scope of loads that need to be taken into consideration when designing the vessel assembly 120 and its integration into a vehicle. Of these, radial pressure loads that can lead to ovalization of the cylindrical shape of vessel 122 need to be considered to avoid the occurrence of local bending and related delamination Likewise, the forces that act to produce torsional loads on vessel 122 can be avoided through a judicious choice of winding architecture to ensure that vessel 122 has a high torsional stiffness and resistance. Collectively, all of the loads discussed herein, where due to impact, fuel pressure or thermal effects, by virtue of placing loads on the vessel 122, shells 124, rings 126 (or other parts of assembly 120), are considered to be structural loads.

This high degree of stiffness (whether, radial, tangential or longitudinal) may be particularly useful when integrated into the body of a vehicle (such as chassis 1 of FIG. 1) in that when loaded in an appropriate direction, it can help to stiffen the chassis 1 or other part of a vehicular body. Furthermore, because the vessel 122 is designed as an inter-fiber fracture (IFF)—supercritical structure, it would be preferable to transmit the loads into the vessel 122 homogeneously. IFF, also known as matrix cracking, is a failure in a composite layer where the crack is parallel to the fiber direction. IFF-supercritical means that the designed structure is allowed to have some degree of IFF. Within the context of a fuel tank or related container such as vessel 122, one cause of IFF may occur due to high inner pressure. Homogeneous load transmission is the transmission of a uniform load over an area that is large enough such that the load causes uniform stresses, whereas a high local load would cause high stresses that could damage an IFF-weakened composite material. Likewise, finite element (FE) analysis conducted by the present inventors have shown three areas of particular interest in load transmission. The first is slip between the shells 124 and the unloaded vessel 122 by deformation of the frame 10, the second is from shell edge pressure and the third is local IFF by frame 10 deformation.

In automotive applications, significant load criteria have to be met for all major axes in the Cartesian coordinate system mentioned above. Examples include withstanding the aforementioned high acceleration forces F, loads due to the expansion of the vessel 122 by inner pressure and loads due to elastic and thermal deformation of the vehicle under normal operating conditions. Furthermore, while some of these loads may not interact with one another (for example, the acceleration forces generally arise only for high vehicular velocities, while the high elastic deformations of the vehicle only occur for lower velocities), consideration must be placed on the fact that some of these loads (such as expansion by inner pressure and thermal deformations) have a tendency to interact with other loads.

Modeling the vessel 122 within a notional vehicle (such as vehicle chassis 1 depicted in FIG. 1) helps to characterize the nature (including orientation) of the load transmission by quantifying the reinforcing effect of vessel 122 based on the position and orientation within vehicle 1. Such modeling helps to identify where the placement of the vessel assembly 120 relative to the frame 10 can be to maximize certain structural properties, such as (for example) torsional stiffness. In one representative modeling, the inventors assumed a generally U-shaped frame profile, along with various placements of a notional vessel assembly to arrive at a general measure of vessel assembly placement goodness. The results of such modeling are shown below in Table 1.

TABLE 1

| ACB location of the vessel | load transmission point-direction | torsional stiffness [MNm/rad] | ratio |
| --- | --- | --- | --- |
| closed section O-profile (base-profile, benchmark); no vessel | — | 4.2 | 1 |
| U-profile; no vessel | — | 0.267 | 0.06 |
| U-profile; vessel in the rear | horizontal | 58 | 13.8 |
|  | vertical | 66 | 15.7 |
| U-profile; vessel between front- and rear-axle | horizontal | 208 | 49.5 |
|  | vertica | 287 | 68.3 |

TABLE 1-continued

| ACB location of the vessel | load transmission point-direction | torsional stiffness [MNm/rad] | ratio |
|---|---|---|---|
| U-profile; vessel in the rear by longitudinal bars | horizontal vertical | 19.5 67.5 | 4.6 16.1 |

As can be seen from the above table, the best reinforcing effect of the vessel 122 can be obtained for the position between the axles. Of course, because this would intrude into the passenger compartment, such placement will need to be reconsidered. These (as well as other design considerations) may be taken into consideration when modeling the vessel assembly 120.

Figure 4:
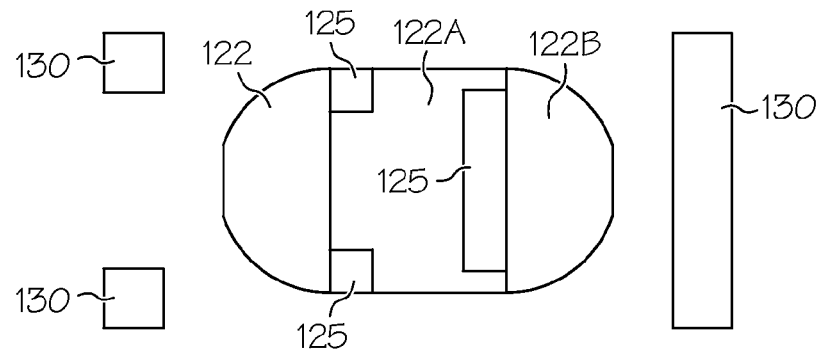
FIG. 4 depicts a design space of a vessel placed within a frame according to an aspect of the invention.

Referring next to FIG. 4, a hydrogen fuel storage vessel 122 (without the shells 124) placed relative to a vehicular frame and related reinforcing elements is shown. By way of example, frame 10 may be made up of a series of generally longitudinal bars 130, where the ones on the left side of the figure shown extending into and out of the page and the ones on the right extend vertically up and down such that together, the various bars 130 can form a box-like structure. Connection locations formed between the shells 124 and the longitudinal bars 130 (some of which may extend vertically upward to give the frame a higher degree of stiffness) can be such that the shells 124 that extend from one end of the vessel 122 are vertically stacked relative to one another; such vertical stacking increases the rigidity of the integrated assembly 120 and frame 10 in a manner consistent with the results from Table 1 above. The vessel 122 includes a generally cylindrical shape center 122A (in one embodiment, approximately 10 inches long) with domes 122B (each adding approximately 9 more inches to the overall length of vessel 122). Apertures formed in opposing longitudinal ends of the vessel 122 may be outfitted with valves to provide selective fluid communication paths for introduction to or removal of the fuel. In general, vessel 122 is sized to fit within the space created in chassis 1, depending on the size of the frame 10 into which it is integrated. Longitudinal bars 130 are used to provide a connection location to the vessel 122; such connection may be through bolts, screws or other well-known fastening devices. Joint locations 125 (as will be further discussed below in conjunction with FIG. 5) can serve as locations about the cylindrical center section 122A to facilitate its connection to the joints 124A4 and 124B4 of shells 124 through clamping rings 126. Such joint locations 125 may also serve as a connection point for a graduated ramp where the shells 124 meet the vessel's cylindrical shape center 122A and the one of the domes 122B.

In a preferred form, vessel 122 is of a composite structure made from a fiber-reinforced polymer. Numerous ply orientations are possible, such as a balanced ply laminate and a hoop ply. The necessary torsional stiffness of the cylindrical portion of vessel 122 can be determined based on the well-known formula:

$$C_T = \frac{G_{y\theta} I_P}{l_{CA}}$$

where $G_{y\theta}$ is the shear modulus of the laminate, $I_P$ is the torsional moment area and $l_{CA}$ is the length of the cylindrical area. In one exemplary form, where carbon fiber is used as the reinforcement medium and assuming the above dimensions, $C_T$ is about 174 MNm/rad.

Figure 5A:
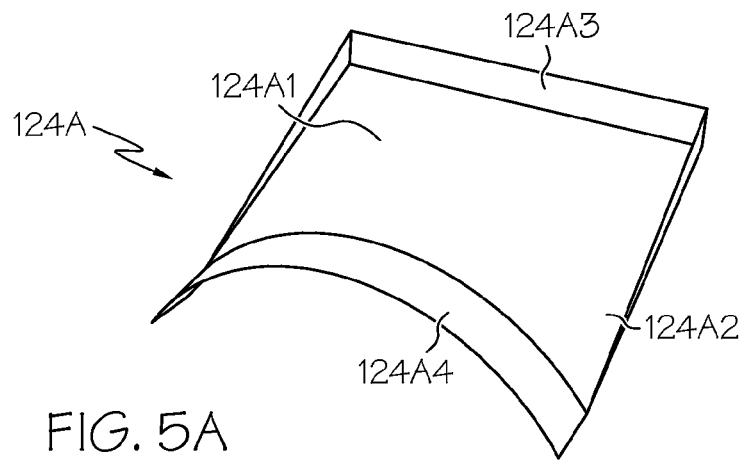
FIGS. 5A and 5B show two different shell embodiments that may be used in the vessel assembly of the present invention.
Figure 5B:
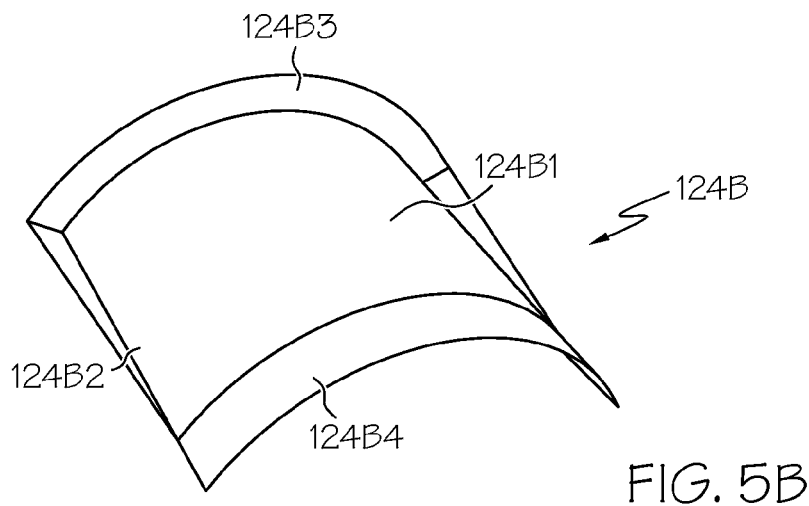

Referring with particularity to FIGS. 5A and 5B, variations of the shell configurations are shown, including both a free-shaped shell 124A and a cylindrical shell 124B. Each of the shells is made up of a middle section 124A1, 124B1, an outer (or edge) section 124A2, 124B2, a flange 124A3, 124B3 and a joint 124A4, 124B4. As discussed above in conjunction with FIG. 4, the joints 124A4, 124B4 are where the shells 124A, 124B are secured to the respective joint locations 125 on vessel 122, while flanges 124A3, 124B3 are used to connect the shells 124A, 124B to the frame 10. Although not shown, it will be appreciated by those skilled in the art that this latter connection may be by way of bolts, screws, adhesive or other conventional fastening means.

The raised end (ledge) produced by the flanges 124A3, 124B3 reduces the risk of early buckling by providing a larger moment of inertia. Analyses conducted by the inventors shows that both shell variants should have sufficient stiffness, and that of the two, the cylindrical shell 124B is possessive of a greater resistance to buckling than the free shaped shell 124A, while the free shaped shell 124A is lighter than the cylindrical shell 124B. Separate analysis conducted by the inventors indicated that the stiffness of the cylindrical shell 124B is significantly higher (upwards of four times higher) than that for the free shaped shell 124A.

The shells 124 can be made from numerous materials, although in one preferred embodiment, such material can be sheet molding compound (SMC), which is a sheet material made up of a thermoset polymer as matrix and randomly oriented glass fibers. In one form, the fibers may be between 30 and 50 millimeters in length. SMC gets pressed to the desired shape and then cured in the heated tool. The shells 124 can be mounted to vessels 122 by clamping rings 126, which in one form are made from materials similar to those of the vessel 122 and shells 124, such as a glass fiber reinforced epoxy or related plastic. When configured as a fiber-reinforced composite, shells 124A and 124B can be made with various forms of fiber reinforcement, where a trade-off between shell mass and shell stiffness can be one of the determining factors. The inventors have determined that one particular form of reinforcement, made of substantially x-shaped fiber plies, achieved the highest increase in stiffness-to-weight ratio. Additionally the shells could be reinforced (especially against buckling) by stiffeners (such as UD layers, ribs and beads).

Vehicular integration concerns will also have to be taken into consideration for both material choices and shell 124 configurations. For example, the structural efficiency advantages of the cylindrical shell 124B may have to be balanced against the greater ease of joining the rectangular flange 124A3 of the free shaped shell 124A to the generally planar mating surface of the longitudinal bar 130 or related surface of frame 10. As such, integration concerns could make it more difficult to join the round flange 124B3 of the cylindrical shell 124B to the longitudinal bar 130. Considerations such as these leads to a trade-off in flange configurations.

Figure 7A:
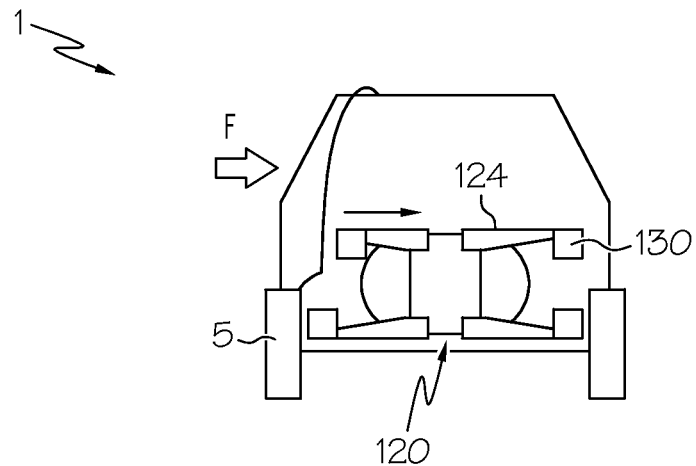
FIGS. 7A and 7B show how eccentric side and frontal impacts may impart a load to both the vessel assembly and vehicular frame.
Figure 7B:
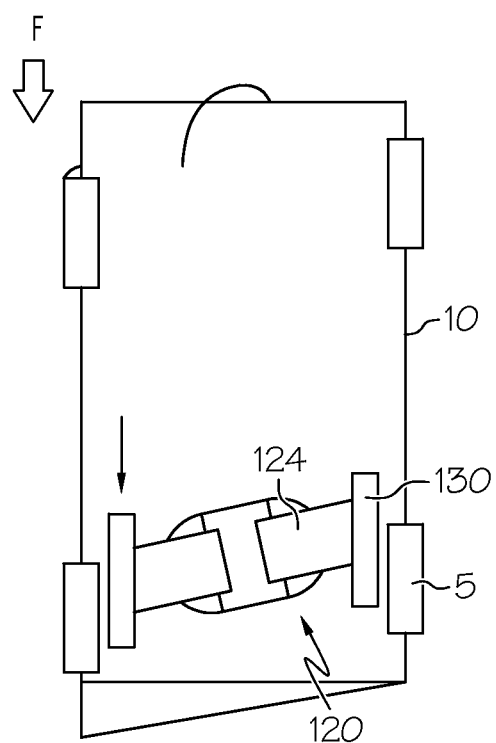

Referring next to FIGS. 7A and 7B, a scenario for both longitudinal and lateral offset impacts (such as due to a collision) to a vehicle with a simplified version of chassis 1 are shown. In such case, the loads imparted to the assembly 120 through shells 124 are unbalanced. For example, in the side impact force F shown in FIG. 7A, the impact causes compression of the upper left shell 124, while in the frontal impact force F shown in FIG. 7B, the impact causes the leftmost shells 124 to flex edgewise relative to the ones on the right. Such impacts, along with their eccentrically-applied forces, could result in only one of the load-transmission-elements bearing the entirety of the load. Even in such event, it is important that the fuel storage vessel assembly 120 keep its connection to the frame 10 or longitudinal bars 130 (that may act as part of frame 10 or an intervening structure between frame 10 and assembly 120) in order to have crash energy be dissipated by deformation of the frame 10, or (in more severe cases) to have impact-elements dissipate crash energy. In the present context, impact elements are designed as special structures which will fail continuously when hit by an impact force, thereby avoiding a sudden and total collapse of the shell and vessel. It will be appreciated by those skilled in the art that there are additional ways to dissipate crash energy or to keep the joint of the vessel and the shells after an impact.

The inventors conducted analyses comparing the stiffness of a notional vehicular frame with an integrated vessel 122 to one without the vessel 122 using a single 1000 N edgewise loading. In a first analysis (where the integrated vessel 122 was not present), the load causes a displacement of 0.16 millimeters, which corresponds to a frame stiffness of 6202 $N/mm^2$. In a second analysis, the vessel 122 was assembled into the frame in an integrated fashion such that at least a portion of the applied load would pass through the vessel 122. The same 1000 N load caused a displacement of 0.1 millimeters, corresponding to a stiffness of 10000 $N/mm^2$, or about a 1.6 factor of increase. While further refinements are possible, and other factors may or may not be included to increase or decrease this stiffness magnification, it will be appreciated by those skilled in the art that significant improvements in the load-bearing ability of a vehicular frame can be realized by following the approaches of the present invention. The above is given only by way of example as a way to compare known stiffnesses, and that by analogizing the edgewise loading scenario above, the present inventors believe that comparable improvements in even more relevant factors, such as vehicular torsional stiffness, could also be realized.

Figure 8:
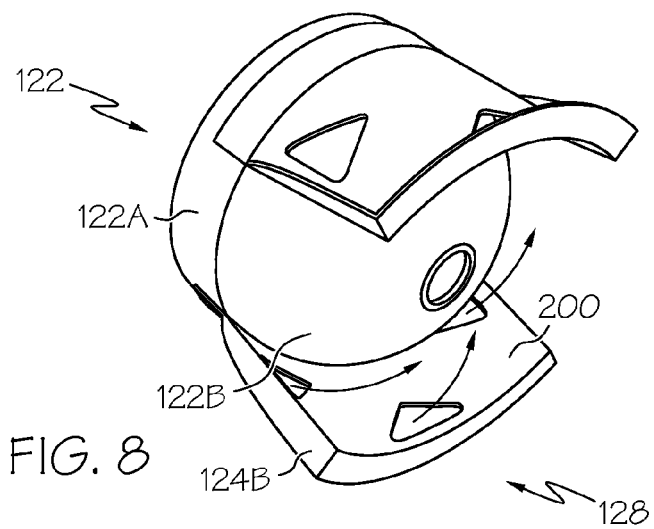
FIG. 8 shows a simplified end of a vessel and shells including openings formed in the shells.

Referring with particularity to FIG. 8, thermal effects may also be accounted for. In particular, the inventors have determined that one or more pressure-relief valves (not shown) may be mounted to the vessel 122. Such valves can open up in the event of a temperature excursion (for example, a fire in the vicinity of vessel 122) to allow the pressure that would otherwise build up in vessel 122 to be relieved. The valve is controlled by a temperature sensor (not shown). Because the shells 124 may be positioned relative to the temperature sensor in such a way as to insulate it from the heat source, the time until the pressure release signal is sent to the valve may be delayed or even (in a worst case) prohibited. To avoid this, at least the shells that could be expected to be exposed to a high temperature source (such as a fire) can have openings 128 formed in them to more easily permit the heat stream 200 to flow to the sensor. In situations where the shells 124 are made of a composite, such openings 128 can be designed-in (for example, avoiding significant load paths) such that their impact on the load-bearing capacity of the vessel assembly 120 is minimized. In one form, the bottom shell (which is more likely to be exposed to fire or another heat source) may include the openings 128, while the upper shell does not. In another form (such as that of the embodiment depicted in FIG. 8), both the upper and lower shells 124A may include openings 128. In either event, at least one of the openings 128 may allow ease of flow of the heat stream 200 to the valve.

Figure 9A:
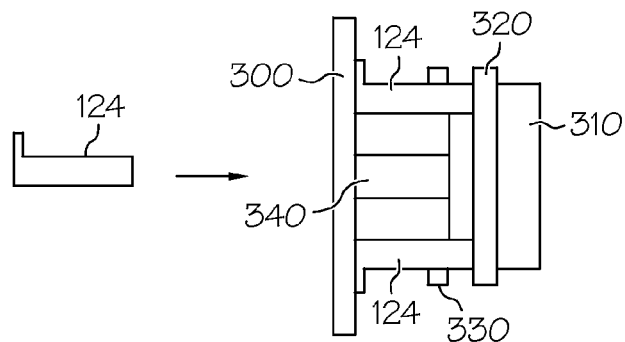
FIGS. 9A through 9D show steps used in assembling the shells to the vessel.
Figure 9B:
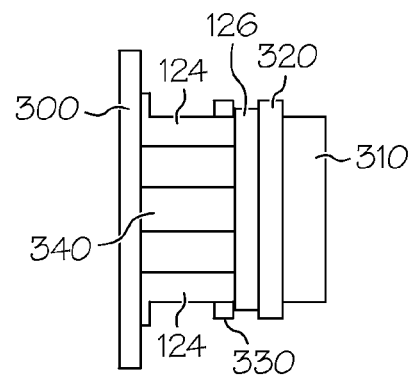
Figure 9C:
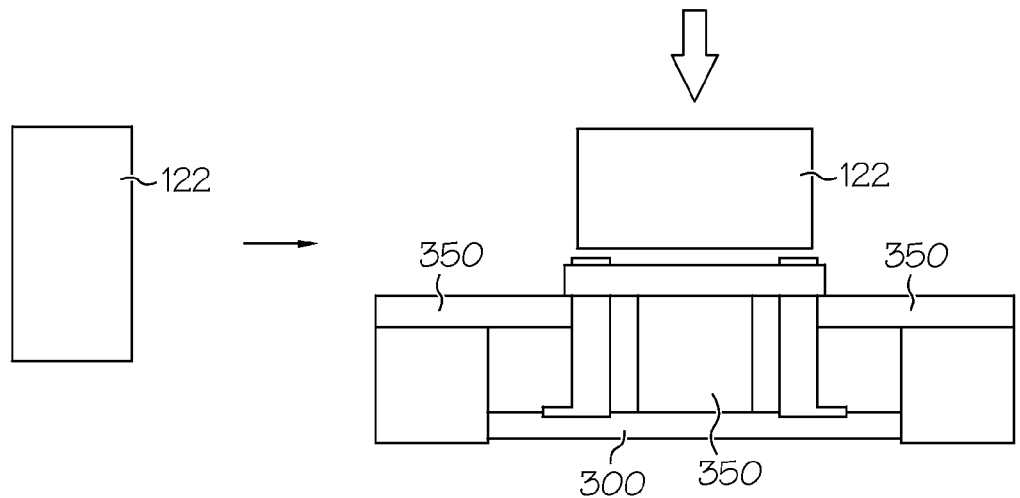
Figure 9D:
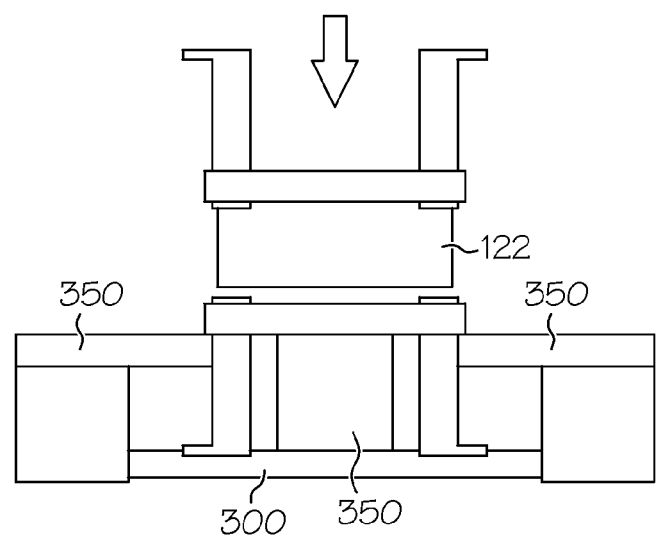
Figure 10A:
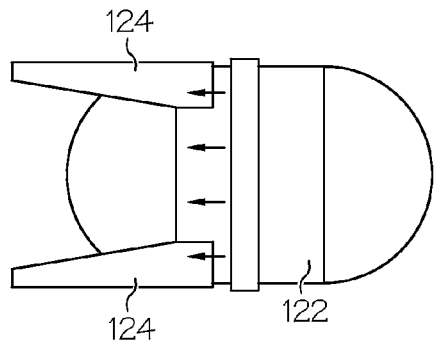
FIGS. 10A and 10B show an alternate way to assemble the shells onto the vessel.
Figure 10B:
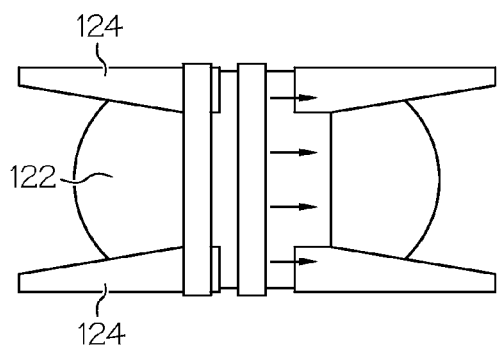
Figure 11A:
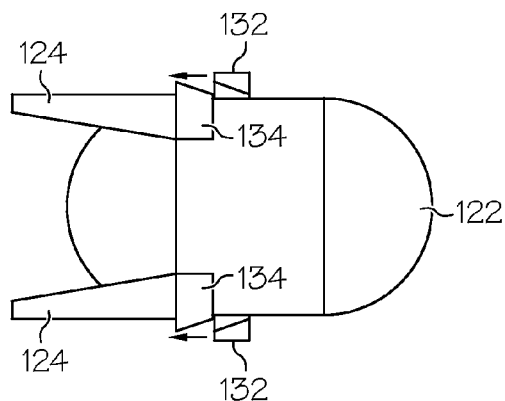
FIGS. 11A and 11B show yet another alternate way to assemble the shells onto the vessel.
Figure 11B:
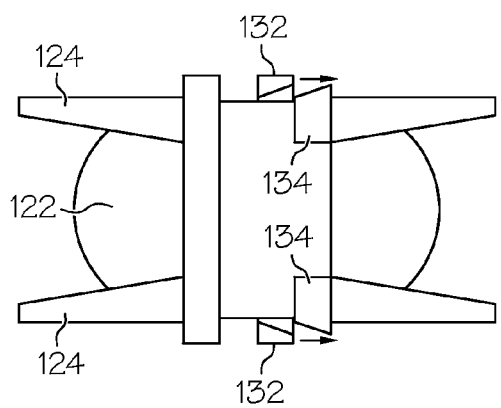

As mentioned above, in one preferred form, both the vessel 122 and the shells 124 may be made from a composite material. In one representative manufacturing form, the vessel 122 (domes not shown in FIGS. 9A through 9D) can be wound on a mandrel using any known ply configuration. Likewise, a balanced ply laminate may be used in conjunction with a hoop ply. The shells 124 may be laminated onto a split tool made of aluminum. Such a tool is easier to mill and benefits the removing of the shells 124 upon completion. The shells 124 may be made of randomly oriented glass fibers with a thermoset resin or other suitable structural composite material as SMC, as well as from known metals or their alloys, such as steel or aluminum. In one embodiment, the thickness of the shells 124 is dictated by the structural needs of the vessel 122. The clamping ring 126 can be produced as a hoop by known methods, while the assembly 120 of shells 124, vessel 122 and clamping rings 126 can be done as follows. First, as shown in FIG. 9A, two of the shells 124 are fixed with screws or related fasteners onto a plate 300 which is connected to a winding mandrel 310. The clamping section of the shell 124 is located on the mandrel surface. A setting-out is defined by an aluminum winding stop 320 on the mandrel and on the shells 124. Next, as shown in FIG. 9B, clamping ring 126 can be wound as a circumferential layer around the two shells 124. The diameter of the mandrel 310 is slightly smaller than the diameter of the vessel 122, thus making the inner diameter of the clamping ring 126 slightly undersized. In another form, the clamping could also be made separately from the shells. The clamping ring and the shells are bonded by an adhesive in an additional step. Next, as shown in FIG. 9C, the vessel 122 is pressed into the shells 124 that, along with the clamping ring 126, is supported by a press support 350. An uncured adhesive can be used as a lubricant. The force (labelled "press 1") can be any needed amount to ensure adequate part consolidation. Finally, as shown in FIG. 9D, the parts from the steps shown in FIGS. 9B and 9C are pressed together under the load entitled "press 2", where additional adhesive or lubricant can be used.

Referring next to FIGS. 10A, 10B, 11A and 11B, two other forms to assemble the shells onto the vessel are shown. In the version depicted in FIGS. 10A and 10B, the shells 124 may first be placed over one of the ends of vessel 122, after which a pair of clamping rings 126 may be placed around the vessel 122. The rings 126 are of sufficient diameter such that they are pressed over the shells 124. After this, the shells 124 at the other end of the vessel 122 are placed so that afterwards, the second of the clamping rings 126 gets pressed over the upper and lower shells 124 on the other end of vessel 122. The clamping rings 126 may have a wedge shape. In one form, the wedge angle is less than about 15° Likewise, a wedge load introduction ring 132 is shown in the version depicted in FIGS. 11A and 11B. It operates in a manner generally similar to the clamping rings 126 discussed in conjunction with the device of FIGS. 10A and 10B, and may also include a wedge counterpart 134, which could be a separate part (such as a ring), or integrated into the shell 124. In another version of the concept, the press direction could be switched. Such may be useful in situations where the space between the shells 124 and the wedge load introduction ring 132 is sufficient before pressing.

Other features may be employed as well. For example, the assembly 120 may also include a generally compliant spacer to allow some degree of impact absorption. Because the vessel 122 and shells 124 are stiff structures, any dimensional increases in vessel 122 due to its being filled with the gaseous fuel would be imparted to the longitudinal bars 130 of frame 10. To avoid deformation of the longitudinal bar 130 (and derivatively, to the car body) a flexible spacer, such as in the form of a soft adhesive, may be placed between the shells 124 and the car body. In another form, longitudinal bar 130 may have a flexible region designed into it. In the case of relatively small deformations (for example, on the order of about 0.7 mm per shell, which may arise out of filling the vessel up to working pressure with fuel) will be absorbed by such a flexible spacer or related element.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A fuel cell-powered vehicle comprising:
   a wheeled chassis configured to support a passenger compartment and comprising a frame defining a resistance to deformation from at least one externally-applied load;
   a source of motive power coupled to said chassis, said source of motive power comprising at least one fuel cell; and
   a fuel supply system fluidly coupled to said source of motive power such that operation therebetween contributes to turning at least one wheel of said chassis, said fuel supply system integrated with said chassis through a fuel vessel assembly comprising:
   a vessel defining a fuel storage containing volume and at least one aperture formed therein such that a fuel may be introduced into, contained within and removed from said volume; and
   a plurality of shells formed with and extending from said vessel such that structural loads imparted to said frame pass through said plurality of shells and said vessel such that a load-bearing capability of said frame is enhanced thereby.

2. The vehicle of claim 1, further comprising at least one clamping ring disposed about at least one shell of said plurality of shells to provide enhanced connectivity between said vessel and said at least one shell.

3. The vehicle of claim 2, wherein at least a portion of said assembly is made from a metal or a fiber-reinforced composite material.

4. The vehicle of claim 1, wherein at least one shell of said plurality of shells further comprises at least one supplemental buckling reinforcement element formed therein.

5. The vehicle of claim 4, wherein said at least one supplemental buckling reinforcement element is selected from the group consisting of unidirectional fibers, ribs, beads and combinations thereof.

6. The vehicle of claim 1, wherein said plurality of shells are secured to said vessel such that upon attachment of said assembly into said vehicle, said attachment is formed along a substantial vertical axis of said vehicle.

7. The vehicle of claim 1, wherein said vessel defines a substantially cylindrical structure with at least one end thereof formed as a dome such that at least one shell of said plurality of shells is secured to said vessel through a graduated ramp connection formed along at least a portion of said dome.

8. The vehicle of claim 1, further comprising a relief valve cooperative with said vessel such that upon being exposed to an excessive temperature, said relief valve opens to reduce an internal pressure formed in said vessel by a fuel contained therein.

9. The vehicle of claim 8, wherein at least one shell of said plurality of shells defines at least one heat stream opening formed therein.

10. The vehicle of claim 1, wherein said at least one shell of said plurality of shells is configured as a free-shaped shell.

11. The vehicle of claim 1, wherein said at least one shell of said plurality of shells is configured as a cylindrical shell.

12. A chassis for a fuel cell-propelled vehicle, said chassis comprising:
   a frame defining a resistance to deformation from at least one externally-applied load; and
   a fuel vessel assembly structurally coupled to said frame such that the fuel vessel assembly is configured to keep its connection to the frame in the event of a crash, said assembly comprising:
   at least one vessel defining a fuel storage containing volume with at least one aperture formed therein such that a fuel may be introduced into, contained within and removed from said volume; and
   a plurality of shells formed with and extending from said at least one vessel such that structural loads imparted to said frame pass through said plurality of shells and said at least one vessel such that a load-bearing capability of said frame is enhanced thereby.

13. The chassis of claim 12, wherein said frame defines a vertical component such that said structural coupling between said assembly and said frame forms a plurality of connection locations along said vertical component to additionally enhance said resistance to deformation of said frame.

14. The chassis of claim 12, wherein said assembly further comprises at least one clamping ring disposed about at least one shell of said plurality of shells to provide enhanced connectivity between said vessel and said at least one shell.

15. The chassis of claim 14, wherein at least a portion of said assembly is made from a metal or a fiber-reinforced composite material.

16. The chassis of claim 15, further comprising a temperature protection device comprising relief valve cooperative with said at least one vessel such that upon being exposed to an excessive temperature, said relief valve opens to reduce an internal pressure formed in said at least one vessel by a fuel contained therein.

17. A method of enhancing the structural resistance to deformation in a fuel cell-powered vehicle, said method comprising:
   configuring a chassis of said fuel cell-powered vehicle to include a load-bearing frame; and
   connecting a fuel storage vessel assembly to said chassis such that at least a portion of deflection loads imparted to said frame are transmitted through said connection in such a way as to enhance a resistance to deformation inherent in said frame and structurally coupling the fuel storage vessel assembly to said frame such that the fuel storage vessel assembly is configured to keep its connection to the frame in the event of a crash, said assembly comprising:
   a vessel defining a volume therein for storage of a fuel cell fuel that may be introduced into, contained within and removed from said volume; and
   a plurality of shells formed with and extending from said vessel such that structural loads imparted to said frame pass through said plurality of shells and said vessel such that a load-bearing capability of said frame is enhanced thereby.

18. The method of claim 17, wherein said plurality of shells are coupled to said vessel in a plurality of vertical locations that extend beyond a longitudinal dimension of said vessel such that torsional resistance to deflection of said frame is enhanced thereby.

19. The method of claim 17, further comprising arranging said plurality of shells such that said load-transmitting connection forms a plurality of connection locations along a vertical axis component of said vehicle.

20. The method of claim 17, further comprising configuring at least a portion of said assembly as a composite structure.

21. The method of claim 17, further comprising relieving pressure on said vessel such that if said vessel is exposed to an excessively high temperature, pressure caused by an expansion of said fuel in said vessel does not damage said vessel.

* * * * *